Figure 1A:
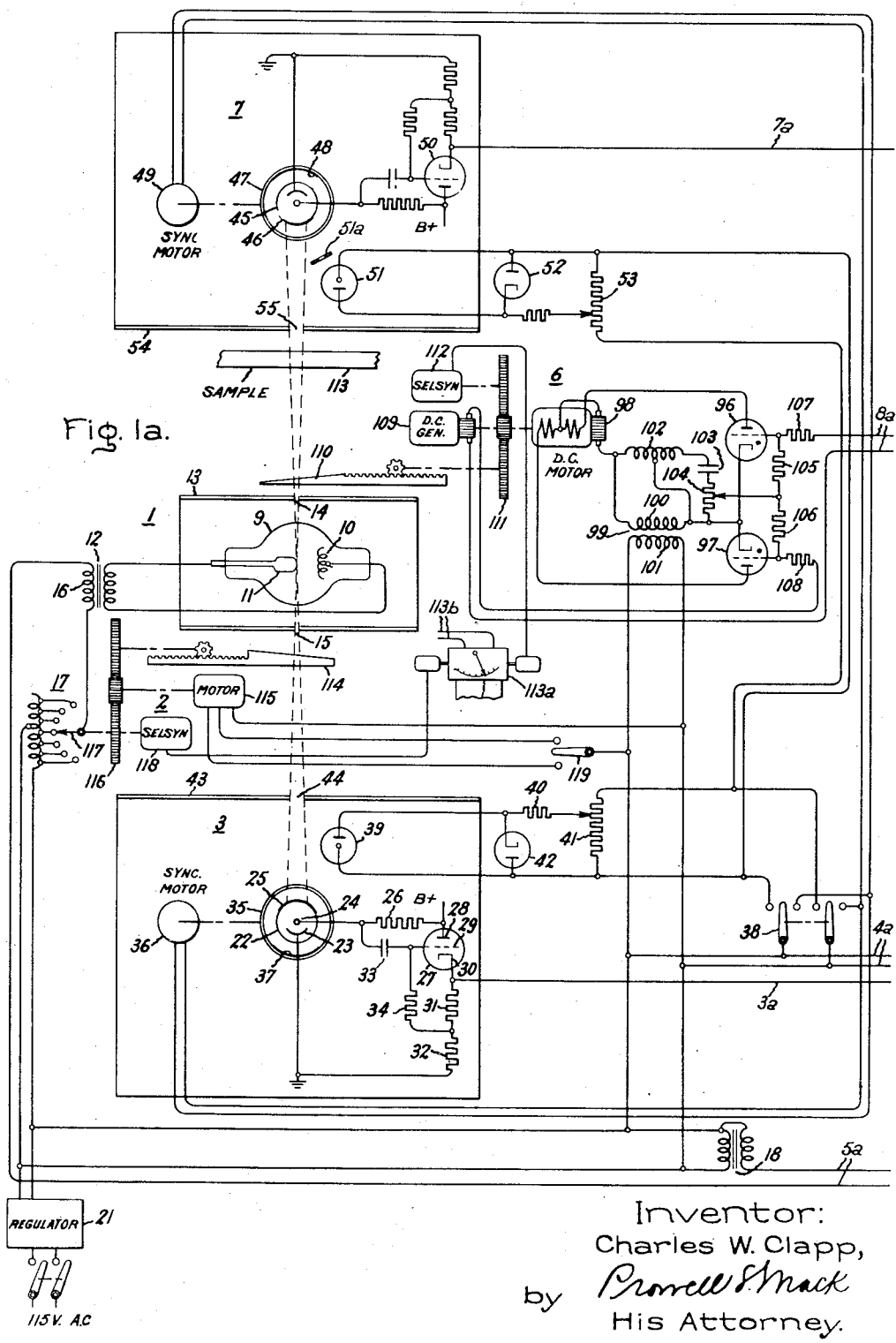

April 19, 1949.　　　　C. W. CLAPP　　　　2,467,812
NONCONTACTING THICKNESS GAUGE
Filed April 1, 1947　　　　　　　　　　　　2 Sheets-Sheet 1

Inventor:
Charles W. Clapp,
by Crowell & Mack
His Attorney.

April 19, 1949.  C. W. CLAPP  2,467,812
NONCONTACTING THICKNESS GAUGE
Filed April 1, 1947  2 Sheets-Sheet 2

Inventor:
Charles W. Clapp,
by Prowell & Mack
His Attorney.

Patented Apr. 19, 1949

2,467,812

UNITED STATES PATENT OFFICE 2,467,812

NONCONTACTING THICKNESS GAUGE

Charles W. Clapp, Schenectady, N. Y., assignor to General Electric Company, a corporation of New York Application April 1, 1947, Serial No. 738,712

8 Claims. (Cl. 250—83.3)

My invention relates to apparatus for gaging the X-ray absorption factors of material under test and more particularly to non-contacting thickness gages utilizing X-ray absorption principles associated with a stabilized source of X-rays.

It is known that thicknesses of X-ray absorbent materials may be measured by determining the intensity of the unabsorbed rays transmitted through the material from a source of X-rays of determinable intensity. X-rays may be most conveniently obtained from an X-ray tube energized from a high voltage A.-C. source. Various means have been devised for measuring the intensity of the unabsorbed rays transmitted through X-ray absorbent material.

Thickness gage systems of this type, however, possess certain disadvantages which affect their accuracy to such an extent that their usefulness is somewhat limited. Heretofore, the main disadvantages have been in the instability of the penetrating power of X-rays produced by an X-ray tube when energized from the usual type of A.-C. source and in the shift of calibration of X-ray intensity measuring means utilized to determine the intensity of the unabsorbed X-rays.

As is known, the composite wavelength of X-rays produced by the usual X-ray tube is critically dependent upon the anode-to-cathode voltage impressed thereon. Since the penetrating power of X-rays through a given material is a complex function of the wavelength of X-rays, it has been found that particularly in the long wave-length range a one per cent change in the anode-to-cathode voltage may change the penetrating power of resultant X-rays as much as twenty per cent. In addition, the intensity of the X-rays produced is dependent upon the filament emission current of the X-ray tube cathode, which emission is a function of cathode temperature.

Calibrated X-ray intensity measuring means have in the past been employed with considerable success, if a close check on the calibration is frequently made by measuring the intensity of X-rays produced by some standard source. Reliance upon the calibration of such measuring means may be made unnecessary if absorption comparison measuring means of the null type is utilized.

It is an object of my invention to provide a non-contacting thickness gage utilizing stabilized X-rays in combination with an X-ray intensity measuring device of the comparison or null type.

Another object of my invention is to provide a non-contacting thickness gage capable of measuring thicknesses over a wide range of values by including features in the X-ray tube energizing circuit whereby the penetrating power and intensity of the X-rays produced are automatically stabilized at any desired value.

A further object of my invention is to provide a non-contacting thickness gage whereby automatic and continuous thickness indications are produced by a measuring system operating on the null principle.

The features of the invention which are believed to be novel and patentable will be pointed out in the claims appended hereto.

For a better understanding of the invention, reference is made in the following description to the accompanying drawings in which the single figure (in two parts $a$ and $b$) is a schematic representation of a preferred embodiment of my invention.

Before proceeding with a description of the details, a general description of the main parts of the apparatus shown in the figure will be helpful. A source of X-rays shown at 1, Fig. 1a, is made to produce two essentially identical X-ray beams. One of these beams is intercepted by a calibrated variable thickness attenuator whose position may be altered, with respect to the X-ray beam, by the control mechanism shown at 2. The unabsorbed X-rays transmitted through the attenuator may be measured by a comparator type X-ray intensity measuring device, shown at 3.

Since the X-ray source as shown is an X-ray tube energized from an A.-C. source, X-ray beams are present during only one-half of each cycle of the energizing source. The intensity of the X-rays reaching the measuring device is compared with some known standard contained therein in such fashion that differences therebetween become evident as a voltage output.

Figure 1B:
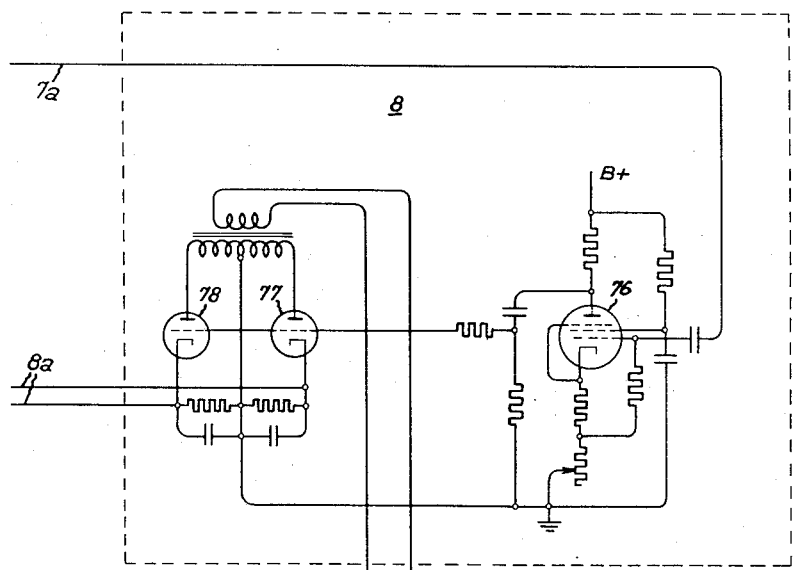
Figure 1B:
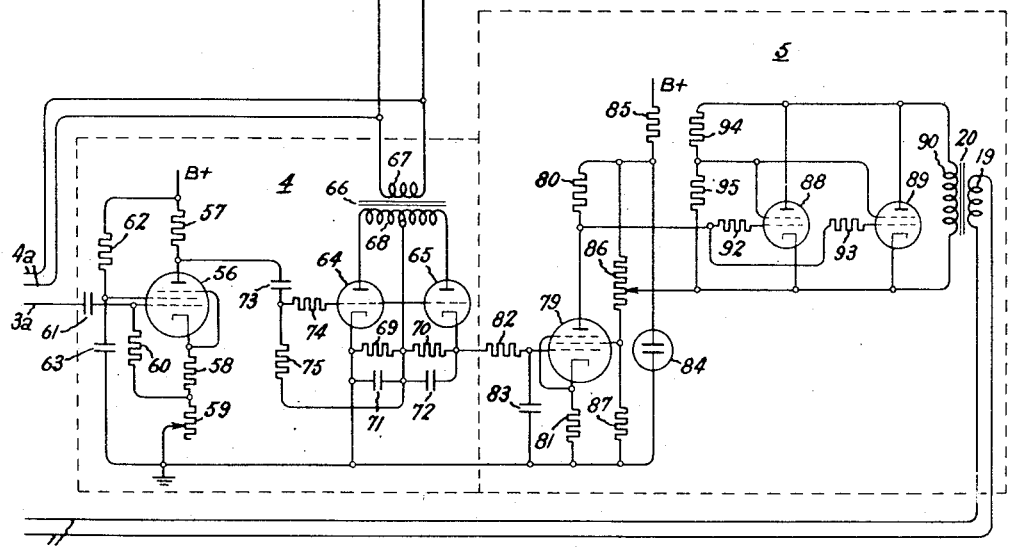

The output of the measuring device shown at 3 is amplified and fed over line $3a$, into a peak comparator circuit shown at 4, Fig. 1b. An electronically-controlled variable impedance, shown at 5, is controlled by the output of the peak comparator. Since the variable impedance at 5 is in series with a lead including wires $5a$ of the energizing circuit for the X-ray tube, control of the penetrating power of X-rays produced at 1 is thereby accomplished. Thus, by adjustment of the mechanism at 2, the X-ray tube may be caused to produce X-rays stabilized as to intensity and penetrating power at any desired value over a wide range of penetrating powers and intensities.

The second X-ray beam produced by the X-ray tube is caused to pass through a variable thickness attenuator whose position is automatically controlled by the mechanism shown at 6, Fig. 1a. A second comparator-type X-ray intensity energizing device, shown at 7, measures the intensity of the unabsorbed X-rays transmitted through a specimen whose thickness is to be determined and through the automatically adjustable attenuator. The output of the measuring instrument shown at 7 controls, over line 7a, an amplifier and peak comparator circuit shown at 8, Fig. 1b. The driving motor of the mechanism at 6 is energized through a constant phase shift, variable bias rectifying circuit, and is controlled, over lines 8a, by the output of the peak comparator circuit shown at 8. Thus, the driving motor at 6 automatically positions the variable thickness attenuator associated therewith so that the unabsorbed X-rays present at 7 are continuously at the desired balance value. The position of this absorption filter, therefore, depends upon the thickness of the material under measurement and its position may be remotely indicated, if desired, by proper connections to the mechanism shown at 6.

The apparatus at 1, 3, 4 and 5 serves automatically to control the supply of voltage on X-ray tube 9 such that the X-rays produced will have a constant, predetermined penetrating intensity of a desired selected value. The unabsorbed X-ray measurement devices at 3 and 7 are made similar and the intensities of the unabsorbed X-rays measured thereby are made equal, subject to such slight departures from inequalities as may be caused by regulation. By so doing, various sources of error that might otherwise exist are avoided and the difference in the thicknesses of the wedges at 110 and 114 is a direct measurement of the thickness of the sample at 113.

Having outlined the main parts of the apparatus, a detailed description will now be given. An X-ray tube 9, Fig. 1a, possessing a cathode 10 and an anode 11 is energized from the secondary of a high voltage step-up transformer 12. A suitable X-ray shield 13 is placed about X-ray tube 9 and is provided with suitable openings 14 and 15, through which openings X-ray beams of essentially equal intensity and penetrating powers may emanate in noncoincident directions. A primary winding 16 of a step-up transformer 12 is connected in series with a multi-tapped autotransformer 17, a step-up transformer 18 and a secondary 19 of a transformer 20 utilized as a variable impedance in a manner to be described. The above described serial connection is energized from a regulated A.-C. source shown at 21.

The comparator-type X-ray intensity measuring device shown at 3 contains the following elements. A photoelectric cell 22, possessing a cathode 23 and an anode 24 and whose transparent envelope is coated, at least over a portion thereof, by a semi-transparent material 25 which may be made fluorescent by X-ray bombardment, is positioned so that X-rays emanating through opening 15 will bombard material 25. Photoelectric cell 22 is energized from a convenient D.-C. source of voltage through a resistor 26 in series with anode 24. It may be found advisable to use a photocell of the multiplier type to obtain increased sensitivity. A cathode follower tube 27, possessing an anode 28, grid 29 and cathode 30, is energized from the same D.-C. source by connecting anode 28 to a positive potential source terminal and connecting cathode 30, through the serially connected resistors 31 and 32, to ground. Anode 24 of phototube 22 is capacitively coupled to grid 29 through a condenser 33. Grid 29 is also connected through a resistor 34 to the junction between resistors 31 and 32. Thus, the cathode 30 of tube 27 assumes a potential with respect to ground of a magnitude dependent upon the stimulus received by phototube 22.

Phototube 22 is enclosed by a cylindrical member 35. Member 35 is mounted for rotational motion and is adapted to be driven by a synchronous motor 36. A radioactive substance 37 is affixed to a section of the interior side wall of member 35. This radioactive substance is of a type capable of exciting fluorescence in the phosphor 25 when adjacent to it, but is shielded from the phosphor by the envelope of phototube 22 when it has moved to a position 180 degrees away. An example of such a radioactive substance is radium D which could be used to excite an adjacent fluorescent substance such as zinc sulfide by the action of its emitted alpha and beta rays. These rays would be almost completely absorbed by the envelope of the phototube 22. Synchronous motor 36 may be energized from the regulated A.-C. source at 21 by properly positioning a switch 38 shown in the drawing in the neutral position, and when so energized rotates the globe 35 and the radioactive substance 37 thereon in synchronism with the voltage applied to the X-ray tube 9. The phase position is made such that the substance 37 comes opposite and excites the material 25, causing it to emit light during the half cycles when the X-rays are not produced. This then comprises a light ray source standard for exciting the phototube alternately with its excitation in response to the half cycle X-ray excitation and with which the X-ray intensity may thus be compared. A similar standard 48 is provided for the apparatus at 7.

I prefer also to provide duplicate alternative light ray source standards at 3 and 7, the former comprising a glow tube 39 positioned near phototube 22 in such a manner that its illumination will strike the photosensitive cathode 23 of phototube 22. Glow tube 39 may be energized through a resistor 40 and a potentiometer 41 by properly positioning switch 38. A diode valve 42 is connected in parallel with tube 39 in such fashion that tube 39 is allowed to become illuminated only during the proper half cycle of each cycle of the energizing A.-C. source. It is preferable to enclose phototube 22, tube 39 and their associated elements within an X-ray and light absorbing means 43 in which is provided an opening 44, through which opening the unabsorbed X-rays emanating from opening 15 in shield 13 may enter. Since motor 36 and tube 39 are to be used non-simultaneously, either one or the other alone may be energized by proper positioning of switch 38. While both light source standards described are not essential, both have their desirable features and I prefer to provide both of these alternative standards for check calibration purposes and to have an extra standard in case of failure of one of them.

A second comparator-type X-ray intensity measuring device, essentially identical with that shown at 3, is utilized to measure the unabsorbed portion of the X-ray beam emanating from X-ray tube 9 through opening 14. This device is shown on the figure at 7, Fig. 1a. Thus a phototube 45, possessing a fluorescent coating 46 on a portion thereof, is enclosed by a rotatable cylindrical member 47, an interior portion of which is coated with a radioactive substance 48. A synchronous motor 49 is provided as a driving means for rotating member 47. The output of phototube 45 is capacitively connected to a thermionic tube 50 utilized in a cathode follower circuit of the type previously described in connection with tube 27. A glow tube 51, which is paralleled by a diode 52, is so positioned with respect to phototube 45 that illumination furnished by tube 51 strikes the photosensitive cathode of photocell 45. Tube 51 may be energized from an alternating current source through a potentiometer 53 by properly positioning switch 38. Synchronous motor 49 may likewise be energized from an alternating current source through switch 38. It should be noted that for one position of switch 38 synchronous motors 36 and 49 are energized, while in the other position glowtubes 39 and 51 are energized. It is desirable to place phototube 45 and its associated elements within an enclosure 54 through which an opening 55 is provided such that X-rays emanating from X-ray tube 9 through opening 14 may enter enclosure 54 through opening 55, thereby impinging upon fluorescent coating 46 on photocell 45.

The voltage output of the intensity measuring device shown at 3 is impressed upon the input terminals of an amplifier and peak comparator circuit shown at 4, Fig. 1b. A pentode-type amplifier tube 56 is utilized in a circuit wherein a resistor 57 is placed in series with the anode, and a resistor 58 and an adjustable resistor 59 are serially connected in the cathode circuit. Since resistors 58 and 59 are not paralleled by a condenser their presence causes degenerative action, the amount of which may be adjusted by varying the adjustable resistor 59. The grid of tube 56 connected through a resistor 60 to the junction between resistors 58 and 59 is also capacitively coupled by a condenser 61 to the output of the intensity measuring device at 3. The suppressor grid of tube 56 is connected to the cathode and the screen grid is connected to B+ through a resistor 62 and capacitively coupled to ground through a condenser 63 in a customary manner.

Triodes 64 and 65 and their associated elements comprise a peak comparator circuit described and claimed in copending application Serial No. 738,711 to Don M. Jacob filed concurrently herewith and assigned to the same assignee as the present invention. The transformer 66, whose primary coil 67 may be energized from the A.-C. source shown at 21, over lines 4a, possesses a center-tapped secondary winding 68 to whose end terminals the anodes of tubes 64 and 65 are connected, respectively. The cathode of tube 64 is connected to the center tap of winding 68 through a resistor 69 in parallel with a condenser 71. Similarly, the cathode of tube 65 is connected to the center tap of winding 68 through a resistor 70 in parallel with a condenser 72. The cathode of tube 64 is maintained at ground potential by connection thereto. The grids of tubes 64 and 65 are connected at a common potential by interconnection therebetween, and are both subjected to the voltage variation of the anode of tube 56 through a coupling condenser 73 and a series resistance 74. A grid biasing resistor 75 is provided between grid resistor 74 and the center tap of winding 68.

In similar fashion, the output of the intensity measuring device shown at 7, Fig. 1a, is capacitively coupled, over lines 8a, into an amplifier and peak comparator circuit shown at 8, Fig. 1b. This circuit, including a pentode-type amplifier tube 76 and triodes 77 and 78 is, with one exception, exactly similar to that described and shown at 4. The only exception is that instead of grounding the circuit at the cathode of one of the tubes 78, it is grounded at the center-tap of the transformer winding supplying voltage to the plates of tubes 77, 78.

The electronically controlled variable impedance shown at 5, Fig. 1b, contains the following elements. A pentode-type amplifier tube 79 is employed in a circuit containing an anode resistor 80 and a cathode resistor 81. The D.-C. output of the peak comparator circuit shown at 4, whose polarity may be positive or negative, is impressed upon the grid of tube 79 through a resistor 82. A bypass and stabilizing condenser 83 is provided between the grid of tube 79 and ground. A constant voltage D.-C. supply for tube 79 is insured by use of a resistor 85 in series with a constant voltage glowtube 84 in series between ground and B+. The junction between resistor 85 and tube 84 is utilized as a supply point for tube 79. Resistors 86 and 87 of appropriate value are utilized in series across tube 84 to maintain the screen grid of tube 79 at the proper potential by connecting it to the junction between resistors 86 and 87. The suppressor grid of tube 79 is connected to the cathode in a conventional manner.

Thermionic tubes 88 and 89 comprise a variable load across the secondary 90 of transformer 20, whereby the amount of impedance represented across primary 19 of transformer 20 may be automatically controlled. Tubes 88 and 89 are similarly connected and additional tubes may be connected in parallel therewith in like fashion if dictated by current flow requirements. The secondary coil 90 of transformer 20 is connected from cathode to anode of each of the tubes 88 and 89 in parallel. The grids of each tube are connected through respective grid resistors 92 and 93 to the anode of tube 79. The cathodes of tubes 88 and 89 are connected at a positive potential with respect to the normal operating potential of their grids by proper adjustment of the tap on resistor 86. Resistors 94 and 95 in series constitute a potential divider circuit across transformer secondary 90 whereby the screen grids of tubes 88 and 89 may be maintained at the proper relationship with respect to their respective anodes. By utilizing such a circuit, the impedance represented by the primary coil 19 of transformer 20 may be automatically varied in accordance with the D.-C. voltage supplied to the grid of tube 79 by the peak comparator circuit embracing tubes 64 and 65.

An electronically controlled D.-C. motor circuit energized from an A.-C. source is shown at 6, Fig. 1a. Thermionic tubes 96 and 97, whose cathodes are connected together are each respectively in series from cathode to anode with separate series windings of a D.-C. series motor 98. The motor circuit is energized by utilizing a transformer 99 whose secondary winding 100 is connected between the cathodes of tubes 96 and 97 and the armature input terminal of motor 98. The primary winding 101 of transformer 99 is energized from the A.-C. source shown at 21. An adjustable fixed phase shift A.-C. grid control voltage for tubes 96 and 97 is provided by utilizing a center-tapped auto-transformer 102, one half of which is connected in parallel with winding 100 of transformer 99, and the voltage across the other half of transformer 102 is impressed across a phase shifting circuit consisting of a condenser 103 and an adjustably tapped resistor 104 in series. The resultant A.-C. voltage shifted in phase with respect to that impressed across tubes 96 and 97 is applied to the grids of tubes 96 and 97 through their respective grid biasing resistors 105 and 106.

In addition, the grids of tubes 96 and 97 have impressed a D.-C. voltage obtained from the peak comparator circuit including tubes 77 and 78, over lines 8a. This may be accomplished by connecting the grid of tube 96 to the cathode of tube 77 through a grid resistor 107, and connecting the grid of tube 97 to the cathode of tube 78 through a grid resistor 108. An anti-hunt feature is preferably introduced by utilizing the D.-C. voltage of a generator 109 in the series connection from the grid of tube 97 to the cathode of tube 78. It is apparent that the output of generator 109 may be introduced at any other point in the grid circuit under consideration.

The variable speed reversible motor 98 is utilized to drive generator 109 as by a direct connection therebetween and to position a variable thickness wedge-like X-ray attenuator 110 by suitable means such as a gear train 111. In addition, it may be desirable to indicate the position of attenuator 110 on some remote indicating device and a Selsyn generator 112, suitably driven through gear train 111, is therefore provided. The intensity and penetrating power of the X-rays unabsorbed by attenuator 110 pass through the sample or material to be analyzed, shown at 113, and the unabsorbed X-rays passing therethrough are measured in the device shown at 7 which measured value determines the extent and direction of energization of motor 98.

The operator-controlled mechanism shown at 2, Fig. 1a, consists of a variable thickness attenuator 114 which may be positioned with respect to the X-ray beam emanating through opening 15 by energizing a motor 115 which is mechanically connected to attenuator 114 through a suitable gear train 116. In addition, the contactor arm 117 on auto-transformer 17 is also mechanically connected to the gear train 116 in such fashion that motor 115 not only changes the position of attenuator 114 but also correspondingly changes the voltage impressed across winding 16 of transformer 12. This interrelationship is made to be such that as greater absorption occurs in attenuator 114, because of its increased thickness interrupting the X-ray beam, the voltage across winding 16 of transformer 12 is correspondingly increased, such that the unabsorbed X-rays impinging upon phototube 22 are not materially changed when motor 115 is actuated. A Selsyn generator 118 may be provided if it is desirable to indicate remotely the position of filter 114. Motor 115 is manually controlled from any desired position, remote or otherwise, by means of a switch 119 whereby rotation of motor 115 may be made to occur in either direction.

The operation of the embodiment of my invention shown in the drawing may be explained as follows. Its normal operation, unaffected by transient variations of the A.-C. energizing source or thickness variations of the moving sample 113 of material to be analyzed, will be discussed first for that case where switch 38 is positioned to energize glowtubes 39 and 51. Proper direct current sources at B+ and proper filament voltages as required are assumed.

For any desired thickness of attenuator 114 interposed in the X-ray beam emanating from opening 15 in enclosure 13, as may be chosen by proper manipulation of the manually operable switch 119, the unabsorbed X-rays penetrating attenuator 114 impinge upon fluorescent coating 25 on phototube 22 during each positive half cycle of the A.-C. voltage impressed across transformer 12. Illumination dependent upon the characteristics of the fluorescent coating 25 and the intensity of the X-ray beams incident thereon causes phototube 22, by photoelectric action, to create a negative voltage pulse across the cathode resistances 31 and 32 of tube 27 to which the phototube is capacitively coupled. During the next half cycle or negative half cycle of the A.-C. energizing source, glowtube 39 is allowed to become illuminated to the desired degree, which degree is adjustably controlled by proper positioning of the tap on resistor 41. Phototube 22 is thereby affected and a negative pulse occurs across cathode resistors 31 and 32 of tube 27 during each negative half cycle of the energizing source. Glowtube 39 is prevented from becoming illuminated during positive half cycles of the energizing source by action of diode 42 in parallel therewith. Thus a negative pulse of a magnitude dependent upon the intensity of the unabsorbed X-rays impinging upon fluorescent coating 25 appears each positive half cycle, while an essentially constant magnitude negative pulse appears across resistors 31 and 32 each negative half cycle of the A.-C. source and whose constant magnitude is adjustably determined by the setting of the tap on resistor 41.

The resultant series of negative pulses are amplified and inverted in an amplifier circuit of conventional design including tube 56 in which the degree of amplification may be adjusted by regulating the amount of resistance represented by resistor 59. Positive pulses are thus made available by connection to the anode of tube 56, and are capacitively coupled into the peak comparator circuit comprising tubes 64 and 65 and their associated elements. Transformer 66 possesses a tapped secondary coil 68 to whose end terminals are connected the anodes of tubes 64 and 65, respectively. Transformer 66 is energized from the same A.-C. source previously referred to, and is so connected that the anode of tube 65 is positive with respect to the center tap of secondary 68 during the half cycle when a positive pulse, dependent in magnitude upon the intensity of the unabsorbed X-rays reaching phototube 22, is present on the grid of tube 65. Similarly, the anode of tube 64 is positive when a positive pulse, as caused by the illumination of glowtube 39, is present on the grid of tube 64. With instantaneous polarity relationships present as described, the action of tube 64 is such that condenser 71 will become charged to a value dependent upon illumination supplied by glowtube 39, and condenser 72 is similarly charged, through tube 65, to a value dependent upon the intensity of the unabsorbed X-rays impinging upon fluorescent coating 25. In each case the condensers are charged with such polarity that the cathodes of tubes 64 and 65 are positive with respect to the center tap of secondary 68. Since the cathode of tube 64 is maintained at ground potential by connection thereto, the cathode of tube 65 differs from ground potential to an extent dependent upon the difference in charge on condensers 71 and 72. Its position is, therefore, at ground potential if the effect of the unabsorbed X-rays and of glowtube 39 on photocell 22 are equivalent; is positive if the X-ray intensity level is higher than its previously described normal level, or is below ground potential if the unabsorbed X-ray intensity is less than such normal value.

The voltage variation of the cathode of tube 65 is impressed upon the grid of tube 79 utilized as an amplifier. The resultant anode voltage of tube 79 is utilized as the grid voltage on each of a series of tubes operating in parallel as a load across the secondary of transformer 20. In the drawing, only two tubes, namely 88 and 89, are illustrated, but it is understood that additional tubes may be placed in parallel therewith as dictated by total current requirements. In order to operate tubes 88 and 89 at a desired normal negative grid bias, the cathodes of tubes 88 and 89 are maintained at a positive potential, depending upon the setting of the tap on resistor 86, which resistor is a portion of the potential divider circuit across the regulated B+ voltage. A desirable normal bias so obtained is such that tubes 88 and 89 represent an impedance essentially midway between the extremes of their possible impedance values across the secondary 90 of transformer 20. If the cathode voltage of tube 65 becomes positive with respect to ground, the grids of tubes 88 and 89 become biased more negatively, and the equivalent impedance across the secondary 90 is thereby increased. Conversely, when the cathode voltage of tube 65 becomes negative with respect to ground, tubes 88 and 89 become more conducting and their equivalent impedance is correspondingly decreased. It should be noted that tubes 88 and 89 are energized from an A.-C. source and their equivalent impedance is, therefore, extremely high during each negative half cycle. Such action is not objectionable, however, since the X-ray tube whose action is to be affected by the value of impedance represented by tubes 88 and 89 generates X-rays only during positive half cycles.

The energizing circuit supplying the A.-C. cathode-to-anode voltage for X-ray tube 9 includes high voltage step-up transformer 12, a multi-tapped auto-transformer 17, a double winding transformer 18 and transformer 20. The instantaneous polarities on the secondary of transformer 18 and on auto-transformer 17 are such that maximum voltage results when contactor 117 of transformer 17 is rotated in a clockwise manner to terminal position. Transformer 20 has its primary coil 19 connected in series relationship with primary 16 of transformer 12. Since the secondary 19 of transformer 20 is loaded to a variable degree, as previously described, its primary 19 acts as an impedance or voltage dropping resistor in series with primary 16. Thus the resultant voltage impressed across the X-ray tube is dependent not only upon the setting of contact 117 but also upon the instantaneous equivalent impedance represented by transformer 20.

When voltage surges or transient conditions exist in the A.-C. source, represented by regulator 21, a corresponding change in the intensity and penetrating power of the X-rays produced by X-ray tube 9 tends to occur. However, any small change is immediately detected by photocell 22 and by operation as previously described the conductivity of tubes 88 and 89 is correspondingly changed. Thus, a momentary increase in source voltage creates a corresponding increase in the equivalent impedance value of transformer 20, whereby the resultant voltage across transformer 12 remains essentially unaffected by such increase of incoming source voltage. Similarly, any momentary decrease in magnitude of the source voltage results in an appropriate decrease of equivalent impedance as represented by transformer 20. In this fashion the intensity and penetrating power of the X-rays produced by X-ray tube 9 are automatically controlled and maintained essentially constant at the desired level.

The level at which the intensity and penetrating power of the produced X-rays is to be maintained may be chosen over a range of values by shifting the position of attenuator 114 as by energizing motor 115 through switch 119 for rotation in an appropriate direction. If higher intensity X-rays are desired, the thickness of attenuator 114 intercepting the X-ray beam is increased, and by virtue of the interconnection represented by gear train 116 contact 117 is simultaneously changed to provide a higher voltage across transformer 12. It has been found that approximately a linear relationship between the relative movements of contact 117 and wedge 114 causes proper voltage compensation so that the unabsorbed X-rays passing through wedge 114 remain essentially unchanged as to intensity, thereby allowing normal operating level of the regulating system including tubes 88 and 89 to be maintained. It is apparent that any relationship desired between movements of wedge 114 and the voltage change at transformer 17 may be had by adjustment of the tap voltage in changing mechanism of the transformer as for example by a variation in the spacing of the tap changing contacts.

The co-operating elements shown at 2, 3, 4 and 5 causes X-ray tube 9 to produce a stabilized X-ray beam of essentially constant intensity and penetrating power. X-ray tube 9 is utilized as a source of X-rays of the desired intensity and penetrating power for measuring the thickness of a specimen 113 which may be a stationary object or a moving strip or plate. Measurement of the thickness is accomplished in the following fashion.

An X-ray beam emanating from opening 14 in enclosure 13 is partially absorbed in an attenuator 110 of essentially the same type as attenuator 114 but of lesser thickness. The X-ray beam is also intercepted or traversed by the material 113 whose thickness is to be measured. The unabsorbed X-rays emerging therefrom are allowed to impinge upon a fluorescent coating 46 on phototube 45, thereby causing coating 46 to be illuminated to an extent depending upon the intensity of the unabsorbed X-rays incident thereto. The illumination so caused is compared with the illumination provided by a reference source, such as glowtube 51, and converted into a D.-C. voltage existing between the cathodes of tubes 77 and 78 by circuit means identical with those previously described.

The position of attenuator wedge 110 with respect to the X-ray beam emanating through opening 14 is controlled by a driving means, represented by motor 98, through an appropriate gear train 111. The energizing circuit for motor 98 comprises transformer 99, gaseous tubes 96 and 97 and associated elements. During each half cycle when the anodes of tubes 96 and 97 are positive with respect to their respective cathodes, the tubes are capable of conducting current and by means of the phase shifting device, including a condenser 103 and a resistor 104, the tubes are made conductive during a desired portion of each positive half cycle and with the same time duration in each of the tubes 96 and 97. Under such conditions, the pulsating D.-C. current flowing through the two differential field windings of motor 98 are equal and opposite in effect. Thus the resultant torque produced by motor 98 remains essentially zero. If, however, a D.-C. voltage difference exists between the grids of tubes 96 and 97, the time duration of the conductive state in one of the tubes is increased, while that of the remaining tube is correspondingly decreased. In such a case, the currents flowing through the two fields of motor 98 are different in value and a resultant field is set up, thereby causing motor torque to exist in a direction and to a degree dependent upon the value and polarity of the direct current voltage difference between the grids of tubes 96 and 97.

If the illumination produced by fluorescent coating 46 is equivalent in effect to that produced by glowtube 51, the cathodes of tubes 77 and 78 will remain at essentially equal potentials. If, however, these illuminations are unequal, the cathodes of tubes 77 and 78 differ by a D.-C. voltage of a polarity and magnitude dependent upon the extent and direction of inequality of illumination at phototube 45. This D.-C. voltage difference is impressed across the grids of tubes 96 and 97 with such polarity that an increase in illumination provided by fluorescent coating 46 causes motor torque in a direction to move wedge 110 into a position causing greater X-ray absorption therein. Conversely, if the unabsorbed X-rays impinging upon fluorescent coating 46 are of insufficient intensity to cause illumination equal in effect to that of glowtube 51, wedge 110 will be moved by motor 98 to a position causing less absorption of the X-ray beam.

It may be desirable to utilize a D.-C. voltage source, such as generator 109, serially connected in the D.-C. grid control circuit of tubes 96 and 97. Since generator 109 is driven by motor 98, its generated voltage is dependent upon the speed and direction of rotation of motor 98 and when connected to have the proper polarity, it provides therefor a degenerative or anti-hunting feature.

The effective illuminations supplied by glowtubes 39 and 51 may be adjusted by manipulating the taps on resistors 41 and 53, respectively. It is preferable that these be adjusted so that the system is in balance when the total thickness of material interposed in the beam reaching phosphor 25 by attenuator 114 is equal to the total thickness of material in the beam reaching phosphor 46 by attenuator 110 and sample 113. The actual light intensities required to accomplish this balance will depend on the relative distances of phosphor 25 and phosphor 46 from the anode 11 of X-ray tube 9, and on the relative efficiencies of the two phosphors 46 and 25 in converting X-ray energy into visible light energy. For reasons to be explained later, it is desirable that the two glowtubes 51 and 39 operate at approximately equal light intensities so that if the effects mentioned above are such as to require an appreciable difference in illumination on the two phototubes, a light absorbing screen or aperture as indicated at 51a should be interposed in front of glowtube 39 or 51 as required for the purpose of establishing an approximate balance. The tap on voltage divider 53 or 41 can then be adjusted to achieve a more accurate balance for calibration purposes.

It will be noted that the stability and accuracy of this system of thickness measurement depends ultimately on the stability of the two reference light sources represented by glowtubes 39 and 51. If the light output from one of these tubes varied independently of the output of the other tube, the condition of balance of the system would be disturbed and this in turn would be erroneously interpreted as a variation in the thickness of the sample 113. If, however, the light output of both tubes varied in such manner that the ratio of the outputs remained constant, no such error in reading would result. The two light sources 39 and 51 are therefore connected to the same voltage supply so that the effects of a variation in supply voltage are effectively cancelled out. When the above conditions have been satisfied, it is evident that the thickness of the sample 113 plus the thickness of the absorbing portion of filter 110 is equal to the thickness of the absorbing portion of filter 114. It should be noted that this relationship is based on the use of essentially identical materials for filters 110 and 114 and sample 113. Use of other materials is possible after proper calibration.

The operator sets the position of wedge 114 such that its absorbing thickness is near, but greater than, the thickness of sample 113. Wedge 110 is then automatically positioned in the described manner so that its absorbing thickness plus the thickness of the sample equals the absorbing thickness of wedge 114. Remote receivers of the absorbing thicknesses of wedges 110 and 114 may be provided, as represented at 113a, and the thickness of sample 113 may then be represented by the difference in such wedge thicknesses at any desired remote point. The device at 113a may indicate and record the thickness of sample 113 and be provided with control contacts for controlling such thickness over control wires represented at 113b.

It should be noted that the devices shown at 6, 7 and 8 co-operate to allow operation on the null principle; however, the stabilizing apparatus shown at 2, 3, 4 and 5, although similar in most respects, requires a repeated illumination difference at tube 22 to maintain the impedance value as represented by transformer 20 at a desired value different from the normal value. Such requirement, however, has been found to cause little effect upon the accuracy of the thickness measuring device. Thus, it has been found that a change in X-ray intensity of one-half per cent or less will compensate for usual foreseeable voltage fluctuations in the A.-C. source represented by regulator 21. Furthermore, a one-half per cent change in X-ray intensity at phototube 22 has been shown to cause only about two-tenths of one per cent error in thickness measurements when usual metallic materials are being measured. Greater accuracy may be obtained by increasing the sensitivity of the regulating apparatus as by increasing its overall amplification factor.

The range of thickness for which my invention may be utilized is limited only by characteristics and rating of the X-ray tube employed.

As will occur to those skilled in the art, various different arrangements and combinations of the principles described above may be employed without departing from the true spirit and scope of the invention, and I, therefore, do not wish to limit my invention to the particular arrangement described. For example, if a feasible assembly of the apparatus would permit, a single light source standard could advantageously replace lamps 39 and 51.

What I claim as new and desire to secure by Letters Patent of the United States is:

1. In apparatus for gaging an X-ray absorption factor of a material, an X-ray tube, a source of supply therefor, shielding means for said tube provided with window means for emitting two equal intensity X-ray beams, a material to be tested and a first adjustable X-ray absorption attenuator interposed in the path of one of said beams, means for interposing a second adjustable X-ray absorption attenuator in the path of the other X-ray beam, a first measuring means for measuring the intensity of the X-rays which pass through the material and first attenuator, a second measuring means for measuring the intensity of the X-rays which pass through the second attenuator, a variable impedance in the supply of said X-ray tube controlled by the second measuring means for regulating the source of supply of said X-ray tube such that the intensity of the X-rays influencing said second measuring means remains constant, and an electric motor control responsive to the first measuring means for controlling the first attenuator such that the X-ray intensity influencing the first measuring means remains the same as that influencing the second measuring means, whereby the difference between the X-ray absorptions of said two attenuators is proportional to the X-ray absorption of the material under test.

2. In apparatus for gaging an X-ray absorption factor of a material, an X-ray tube, a source of supply therefor, shielding means for said tube provided with window means for emitting two equal intensity X-ray beams, a material to be tested and a first adjustable X-ray absorption attenuator interposed in the path of one of said beams, means for interposing a second adjustable X-ray absorption attenuator in the path of the other X-ray beam, a first measuring means for measuring the intensity of the X-rays which pass through the material and first attenuator, a second measuring means for measuring the intensity of the X-rays which pass through the second attenuator, each of said measuring means including means for comparing the intensity of the received X-rays against a predetermined measurement standard, voltage regulating means in said source of supply controlled by the second measuring means for regulating the source of supply of said X-ray tube such that the intensity of the X-rays influencing said second measuring means remains equal to said standard, and electric motor control means responsive to the first measuring means for controlling the first attenuator such that the X-ray intensity influencing the first measuring means remains the same as that influencing the second measuring means, whereby the difference between the X-ray absorptions of said two attenuators is proportional to the X-ray absorption of the material under test.

3. An X-ray thickness gage, comprising an X-ray tube, a source of supply therefor, shielding means for said tube provided with windows for emitting first and second equal intensity X-ray beams, a material to be gaged interposed in the first beam, a relatively thin adjustable attenuator wedge of the same material also interposed in the first beam, a relatively thick adjustable attenuator wedge of the same material interposed in the second beam, X-ray intensity measuring means influenced by the second beam after passing through the relatively thick attenuator, means including a voltage regulator in the supply source of said X-ray tube controlled in response to said measuring means for maintaining the intensity of the X-rays influencing said measuring means constant at a predetermined standard value, X-ray intensity means influenced by the first beam after passing through the material under test and the relatively thin wedge, and electric motor control means controlled by said last mentioned measuring means for adjusting the relatively thin wedge so as to maintain the X-ray intensity received by the last mentioned measuring means at said predetermined standard value, whereby the difference in the effective thicknesses of said wedges when so adjusted corresponds to the thickness of the material under test.

4. Apparatus for gaging an X-ray absorption factor of a material, comprising an X-ray tube, a source of alternating current supply therefor, shielding means for said tube provided with windows for emitting two equal intensity X-ray beams, a material to be tested and a first adjustable X-ray absorption attenuator interposed in the path of one beam, means for interposing a second adjustable X-ray absorption attenuator in the path of the other beam, a first X-ray intensity measuring means influenced by the X-rays which pass through both the material under test and the first attenuator, a second X-ray intensity measuring means influenced by the X-rays which pass through the second attenuator, said measuring means each comprising a photoelectric cell, a phosphor for converting X-ray intensity into light intensity, a radiant energy standard with which X-ray intensity may be compared, together with means for influencing the photocell by such standard during alternate half cycles of the A.-C. source when the X-ray beam is not produced, and electronic means for comparing the alternate pulses produced respectively by the photocell in response to alternate excitation from the X-rays and radiant energy standard, a variable impedance included in the source of supply to said X-ray tube controlled in response to the second measuring means for maintaining the X-ray influence on the second measuring means equal to that of the standard, and automatic means including an electric motor and its control responsive to the first mentioned measuring means for controlling the first attenuator to maintain the X-ray influence on the first measuring means equal to that of the standard.

5. In X-ray utilizing apparatus, an X-ray tube, an alternating current source of supply therefor and means for automatically controlling the voltage of said source so as to maintain the intensity of the X-rays produced constant and at a predetermined value, comprising a phototube, a phosphor on the exterior surface of said phototube for converting radioactive rays into light rays, a transparent glass enclosure about said phototube, a radioactive substance at one interior surface of said enclosure, means for rotating said enclosure about said photocell in synchronism with said source of supply such that when the X-ray tube is energized the phosphor is excited thereby during alternate half cycles of the alternating current source and resulting current pulses corresponding in value to X-ray intensity are produced by the phototube and during the other half cycles of said source, the phosphor is excited by said radioactive substance and resulting current pulses of a fixed value are produced by the phototube, electronic means for comparing the relative values of such two sets of current pulses, and means controlled by said comparing means for regulating the voltage energizing said X-ray tube so as to maintain the pulses resulting from the X-rays equal to the pulses resulting from the radioactive substance.

6. In X-ray gaging apparatus, an X-ray tube, a source of alternating current supply therefor, screening means about said tube provided with window means for allowing the emission of two X-ray beams, an X-ray beam intensity control system including a first phototube and phosphor positioned to be influenced by one of said X-ray beams, an X-ray gaging system including a second phototube and phosphor positioned to be influenced by the other of said beams, and similar standard light source means for each of said phototubes with which the X-ray intensity influence on said phototubes may be compared, said standards each comprising a glow tube shunted by a one-way valve and connected in parallel to said source so as to flash the glow tubes during the alternate half cycles of the alternating current source when the X-ray tube is not energized.

7. In X-ray utilizing apparatus, an X-ray tube, a source of supply therefor and means for automatically controlling the voltage of said source of supply so as to maintain the intensity of the X-rays produced constant and at a predetermined value, comprising a photocell, a phosphor for converting X-ray energy from said tube to light energy influencing said cell, a standard source of radiant energy, means for alternately causing said photocell to be influenced in response to said X-rays and in response to said standard such that alternate current pulses are produced by said photocell respectively proportional to said alternate influences, electronic means for comparing the relative magnitudes of said pulses, a variable impedance in the supply source to said tube for regulating the energizing voltage thereof, and electronic valve means responsive to said pulse comparing means for varying said impedance and the X-ray intensity of said tube so as to maintain the influencing value of the X-rays the same as the influencing value of said standard on the output of said phototube.

8. In X-ray gaging apparatus, an X-ray tube, a source of supply therefor, a system for automatically controlling the intensity of the X-rays produced by said tube including a photocell and a phosphor the latter being positioned in the path of X-rays from said tube for producing light on said photocell in proportion to the X-ray intensity, nonautomatic means for adjusting the intensity of the X-rays produced by said tube when the gaging range of the apparatus is to be changed, comprising a voltage regulator in said source of supply for increasing and decreasing the X-ray tube voltage, and means for preventing such gaging range voltage changing operation from altering the automatic X-ray intensity control of said tube, comprising an X-ray absorbing attenuator in the X-ray path to said phosphor and photocell together with motor operated means for simultaneously adjusting both the attenuator and said voltage regulator in the proper direction and to the extent necessary to maintain constant the X-ray intensity on the phosphor and which would otherwise be changed due to such nonautomatic change in voltage.

CHARLES W. CLAPP.

REFERENCES CITED

The following references are of record in the file of this patent:

UNITED STATES PATENTS

| Number | Name | Date |
|---|---|---|
| 2,094,318 | Failla | Sept. 28, 1937 |
| 2,264,725 | Shoupp et al. | Dec. 2, 1941 |
| 2,282,198 | Murcek | May 5, 1942 |
| 2,401,289 | Morgan et al. | May 28, 1946 |